(12) United States Patent
Ricks

(10) Patent No.: US 6,415,832 B1
(45) Date of Patent: Jul. 9, 2002

(54) PROTECTIVE VEHICLE COVER

(76) Inventor: Gene W. Ricks, 1207 Marshall Dr., Euless, TX (US) 76039

( * ) Notice: Subject to any disclaimer, the term of this patent is extended or adjusted under 35 U.S.C. 154(b) by 0 days.

(21) Appl. No.: 09/653,845

(22) Filed: Sep. 1, 2000

(51) Int. Cl.[7] .............................................. B56D 65/02
(52) U.S. Cl. ..................................... 150/166; 180/770
(58) Field of Search ......................... 150/166, 154–168; D12/401, 400, 403, 221; 280/770; 296/136

(56) References Cited

U.S. PATENT DOCUMENTS

| | | | | |
|---|---|---|---|---|
| 4,569,108 A | * | 2/1986 | Schwab ...................... 14/17 A |
| 4,858,985 A | | 8/1989 | Wojcik |
| 4,931,333 A | * | 6/1990 | Henry ......................... 428/76 |
| 5,242,206 A | * | 9/1993 | Heck .......................... 296/136 |
| 5,275,460 A | * | 1/1994 | Kraus ......................... 296/136 |
| 5,287,904 A | | 2/1994 | Smith et al. |
| 5,325,568 A | * | 7/1994 | Bruhm ........................ 24/301 |
| 5,401,074 A | | 3/1995 | Timerman |
| 5,492,496 A | * | 2/1996 | Walker ....................... 450/155 |
| 5,516,181 A | | 5/1996 | Thompson |
| D375,078 S | * | 10/1996 | Cobb .......................... D25/16 |
| D377,928 S | | 2/1997 | Tillery |
| 5,664,825 A | * | 9/1997 | Henke et al. ................ 296/136 |
| 5,839,138 A | * | 11/1998 | Weidman et al. .............. 5/636 |
| 6,038,745 A | * | 3/2000 | Rapp ........................... 24/68 R |
| 6,070,629 A | * | 6/2000 | Whiteside .................... 150/166 |
| 6,123,601 A | * | 9/2000 | Hilderbrandt ................. 450/82 |

* cited by examiner

*Primary Examiner*—Lee Young
*Assistant Examiner*—Wen Ngo

(57) ABSTRACT

A protective vehicle cover for protecting a vehicle from hail damage. The protective vehicle cover includes a bottom panel. The bottom panel has a top surface, a bottom surface and a peripheral edge. A top panel has a top surface, a bottom surface and a peripheral edge. The peripheral edge of the top panel is securely attached to the peripheral edge of the bottom panel. The bottom surface is securely attached to the top surface of bottom panel along a plurality of longitudinal lines and latitudinal lines in a grid pattern such that a plurality of discrete packets are defined. Each of a plurality of cushioning members is positioned within one of the packets. A first cinching means cinches a front edge of the top and bottom panels. A second cinching means for cinch a back edge of the top and bottom panels. The attached panels are positioned over a vehicle and the front and back edges are cinched to removably secure the panels to the vehicle.

8 Claims, 2 Drawing Sheets

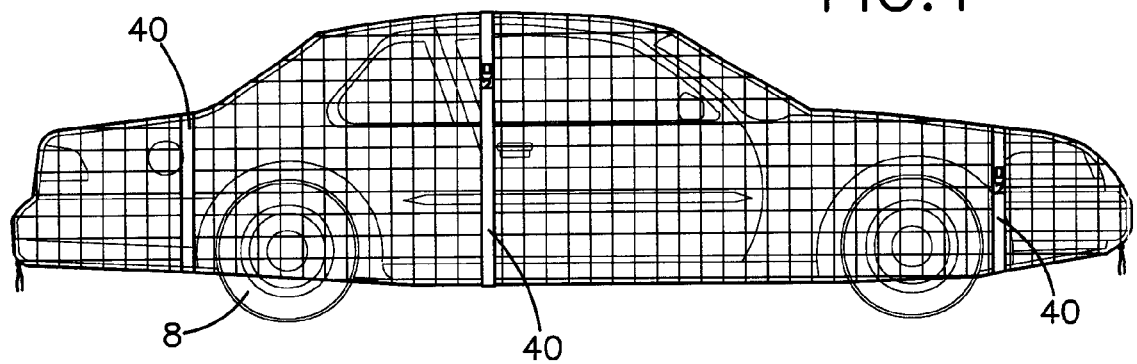
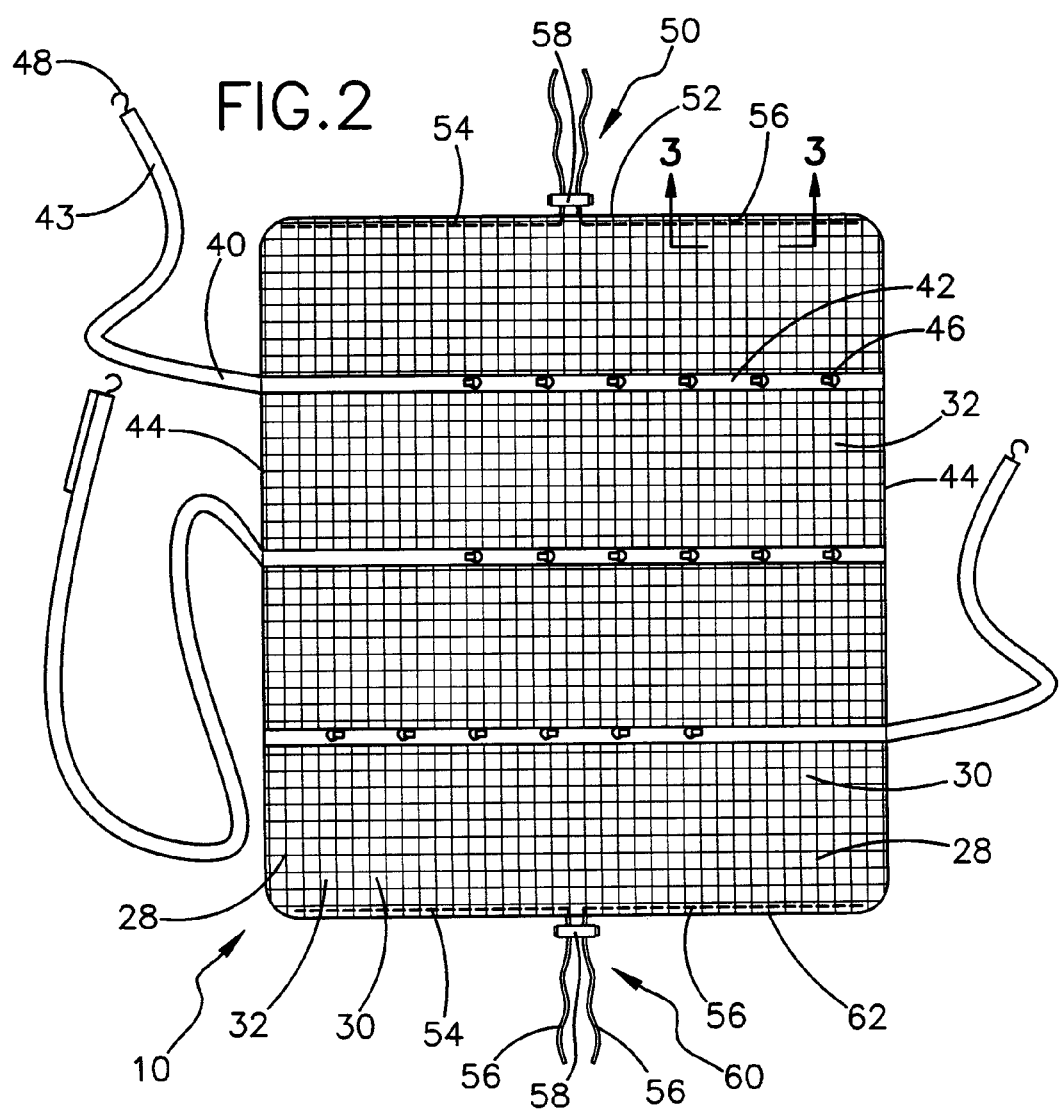

PROTECTIVE VEHICLE COVER

BACKGROUND OF THE INVENTION

1. Field of the Invention

The present invention relates to automotive covering devices and more particularly pertains to a new protective vehicle cover for protecting a vehicle from hail damage.

2. Description of the Prior Art

The use of automotive covering devices is known in the prior art. More specifically, automotive covering devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,516,181; U.S. Pat. No. 5,401,074; U.S. Pat. No. 5,242,206; U.S. Pat. No. 5,287,904; U.S. Pat. No. 4,858,985; and U.S. Des. Pat. No. 377,928.

While these devices fulfill their respective, particular objectives and requirements, the aforementioned patents do not disclose a new protective vehicle cover. The inventive device includes a bottom panel. The bottom panel has a top surface, a bottom surface and a peripheral edge. A top panel has a top surface, a bottom surface and a peripheral edge. The peripheral edge of the top panel is securely attached to the peripheral edge of the bottom panel. The bottom surface is securely attached to the top surface of bottom panel along a plurality of longitudinal lines and latitudinal lines in a grid pattern such that a plurality of discrete packets are defined. Each of a plurality of cushioning members is positioned within one of the packets. A first cinching means cinches a front edge of the top and bottom panels. A second cinching means for cinch a back edge of the top and bottom panels. The attached panels are positioned over a vehicle and the front and back edges are cinched to removably secure the panels to the vehicle.

In these respects, the protective vehicle cover according to the present invention substantially departs from the conventional concepts and designs of the prior art, and in so doing provides an apparatus primarily developed for the purpose of protecting a vehicle from hail damage.

SUMMARY OF THE INVENTION

In view of the foregoing disadvantages inherent in the known types of automotive covering devices now present in the prior art, the present invention provides a new protective vehicle cover construction wherein the same can be utilized for protecting a vehicle from hail damage.

The general purpose of the present invention, which will be described subsequently in greater detail, is to provide a new protective vehicle cover apparatus and method which has many of the advantages of the automotive covering devices mentioned heretofore and many novel features that result in a new protective vehicle cover which is not anticipated, rendered obvious, suggested, or even implied by any of the prior art automotive covering devices, either alone or in any combination thereof.

To attain this, the present invention generally comprises a bottom panel. The bottom panel has a top surface, a bottom surface and a peripheral edge. A top panel has a top surface, a bottom surface and a peripheral edge. The peripheral edge of the top panel is securely attached to the peripheral edge of the bottom panel. The bottom surface is securely attached to the top surface of bottom panel along a plurality of longitudinal lines and latitudinal lines in a grid pattern such that a plurality of discrete packets are defined. Each of a plurality of cushioning members is positioned within one of the packets. A first cinching means cinches a front edge of the top and bottom panels. A second cinching means for cinch a back edge of the top and bottom panels. The attached panels are positioned over a vehicle and the front and back edges are cinched to removably secure the panels to the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new protective vehicle cover apparatus and method which has many of the advantages of the automotive covering devices mentioned heretofore and many novel features that result in a new protective vehicle cover which is not anticipated, rendered obvious, suggested, or even implied by any of the prior art automotive covering devices, either alone or in any combination thereof.

It is another object of the present invention to provide a new protective vehicle cover which may be easily and efficiently manufactured and marketed.

It is a further object of the present invention to provide a new protective vehicle cover which is of a durable and reliable construction.

An even further object of the present invention is to provide a new protective vehicle cover which is susceptible of a low cost of manufacture with regard to both materials and labor, and which accordingly is then susceptible of low prices of sale to the consuming public, thereby making such protective vehicle cover economically available to the buying public.

Still yet another object of the present invention is to provide a new protective vehicle cover which provides in the apparatuses and methods of the prior art some of the advantages thereof, while simultaneously overcoming some of the disadvantages normally associated therewith.

Still another object of the present invention is to provide a new protective vehicle cover for protecting a vehicle from hail damage.

Yet another object of the present invention is to provide a new protective vehicle cover which includes a bottom panel. The bottom panel has a top surface, a bottom surface and a peripheral edge. A top panel has a top surface, a bottom surface and a peripheral edge. The peripheral edge of the top panel is securely attached to the peripheral edge of the bottom panel. The bottom surface is securely attached to the top surface of bottom panel along a plurality of longitudinal lines and latitudinal lines in a grid pattern such that a plurality of discrete packets are defined. Each of a plurality of cushioning members is positioned within one of the packets. A first cinching means cinches a front edge of the top and bottom panels. A second cinching means for cinch a back edge of the top and bottom panels. The attached panels are positioned over a vehicle and the front and back edges are cinched to removably secure the panels to the vehicle.

Still yet another object of the present invention is to provide a new protective vehicle cover that has a middle layer of cushioning material to prevent damage to car by falling hail.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side in-use view of a new protective vehicle cover according to the present invention.

FIG. 2 is a schematic plan view of the present invention.

DESCRIPTION OF THE PREFERRED EMBODIMENT

Figure 3:
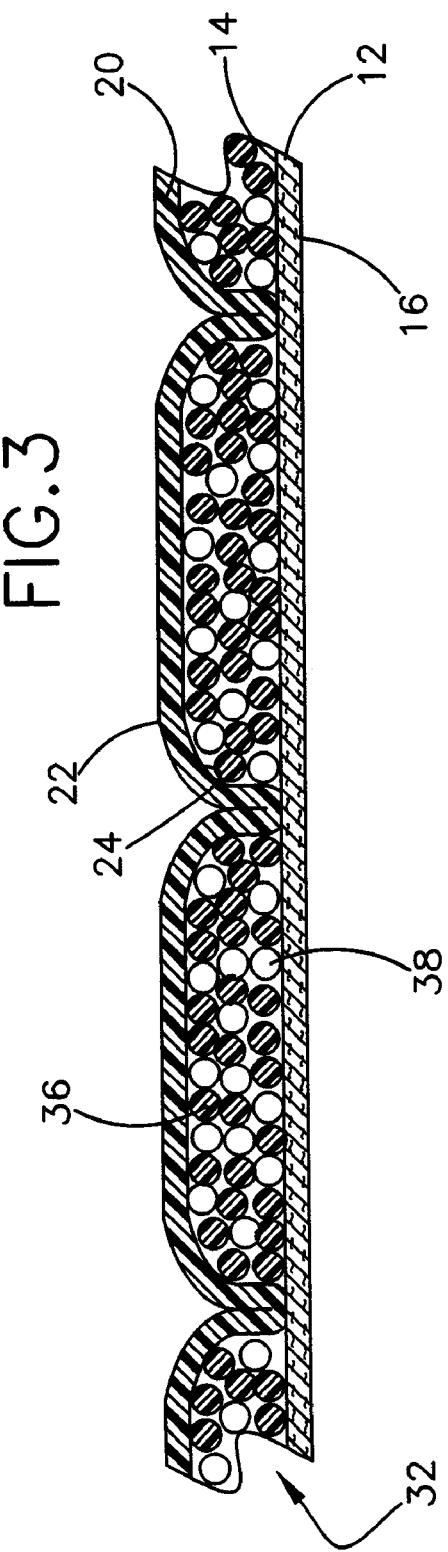
FIG. 3 is a schematic cross-sectional view taken along line 3—3 of the present invention.
Figure 4:
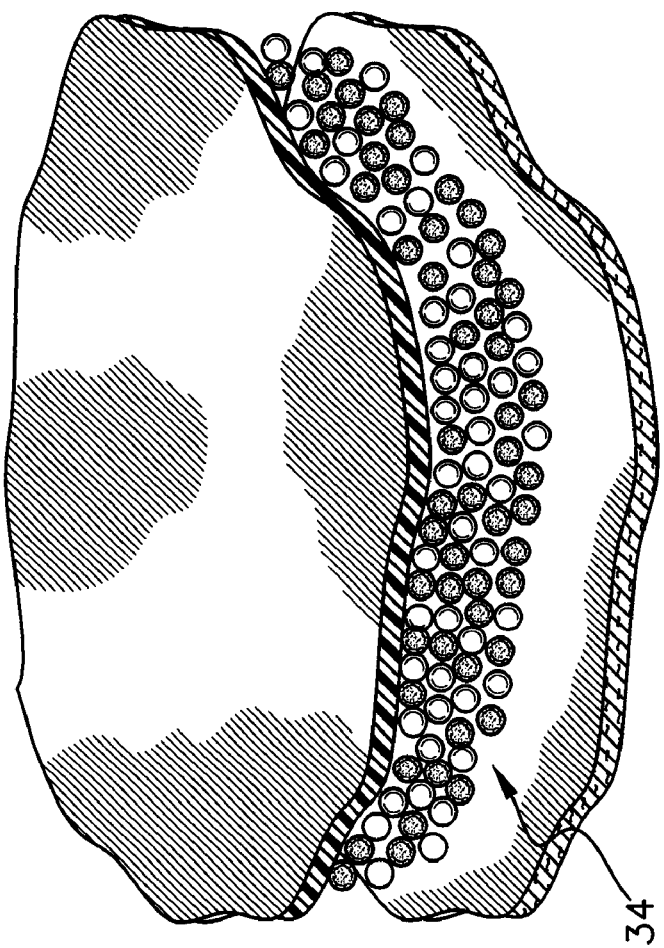
FIG. 4 is a schematic perspective cross-sectional view of the present invention.

With reference now to the drawings, and in particular to FIGS. 1 through 4 thereof, a new protective vehicle cover embodying the principles and concepts of the present invention and generally designated by the reference numeral 10 will be described.

As best illustrated in FIGS. 1 through 4, the protective vehicle cover 10 generally comprises a bottom panel 12. The bottom panel 12 has a top surface 14, a bottom surface 16 and a peripheral edge. The bottom panel 12 preferably comprises a cloth material.

A top panel 20 has a top surface 22, a bottom surface 24 and a peripheral edge 26. The peripheral edge of the top panel 20 is securely attached to the peripheral edge 18 of the bottom panel 12. The bottom surface 24 is securely attached to the top surface 14 of bottom panel 12 along a plurality of longitudinal lines 28 and latitudinal lines 30 in a grid pattern such that a plurality of discrete packets 32 are defined. The top panel 20 comprises a generally water resistant material. The water resistant material preferably comprises tarpaulin.

Each of a plurality of cushioning members 34 is positioned within one of the packets. Each of the cushioning members comprises a plurality of resiliently flexible pellets. The pellets 36 are each preferably comprised of a polystyrene plastic material. The pellets may also be air-filled pellets 38 having a resiliently flexible plastic sheath. An outer surface 22 of a top panel 20 portion of each of the packets 32 generally has a convex shape due to the cushioning members in the packet 32. This eliminates the gap between the packets.

Each of a plurality of strap members 40 is elongate and has a first portion 42 and a second portion 43. Each of the first portions 42 is securely attached to the top surface 22 of the top panel 20 and extends between a pair of lateral side edges 44 of the top panel 20. The first portions 42 have an outer surface having a plurality of loop members 46 thereon. Each of the second portions 43 have an end having a hook portion 48 thereon adapted for releasably engaging one of the loop members 46.

A first cinching means 50 cinches a front edge 52 of the top 20 and bottom 12 panels. The first cinching means 50 comprises a first 54 and second 56 flexible elongate member. Each of the flexible elongate members has a first end securely attached to one of the lateral side edges 44 of the top panel 20. Each of the flexible elongate members extends between the top and bottom panels toward a middle portion of the front edge 52. The flexible elongate members 54, 56 each extend outwardly away from the front edge 52. Each of the flexible elongate members selectively extends through a securing means 58 for selectively coupling the flexible elongate members together.

A second cinching means 60 cinches a back edge 62 of the top and bottom panels. The second cinching means 60 also comprises a first 54 and second 56 flexible elongate member. Each of the flexible elongate members of the second cinching means 60 has a first end securely attached to one of the lateral side edges 44 of the top panel 20. Each of the flexible elongate members extends between the top and bottom panels toward a middle portion of the back edge 62. Each of the flexible elongate members extends outwardly away from the back edge. The flexible elongate members are each selectively extendable through a securing means for selectively coupling the flexible elongate members together. Both of the securing means 58 are conventional securing means typically found on draw strings.

In use, the panels 12, 20 are positioned over a vehicle 8. The cinching means 50, 60 are used to tighten the front and back edges of the panels around the front and back sides of the vehicle. The straps 40 are placed around the vehicle and further ensure that panels do not blow off of the vehicle during a storm. When hail hits the device, the cushioning members 34 absorb the impact so that the vehicle is not damaged.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automotive covering device for protecting a vehicle against hail damage, said device comprising:
   a bottom panel having a top surface, a bottom surface and a peripheral edge;
   a top panel having a top surface, a bottom surface and a peripheral edge, said peripheral edge of said top panel being securely attached to said peripheral edge of said bottom panel, said bottom surface of said top panel being securely attached to said top surface of bottom panel along a plurality of longitudinal lines and latitudinal lines in a grid pattern such that a plurality of discrete packets are defined;
      wherein said top and bottom panels collectively have a front edge for positioning adjacent to a front edge of the vehicle, a back edge for positioning adjacent to a back of the vehicle, and side edges for positioning adjacent to sides of the vehicle, said front and back edges each extending between said side edges;
   a plurality of cushioning members, each of said cushioning members being positioned within one of said packets;
   a first cinching means for cinching said front edge of said top and bottom panels to selectively contract an effective length of said front edge between said side edges and thereby pull front portions of said side edges towards each other;
   a second cinching means for cinching said back edge of said top and bottom panels to selectively contract an effective length of said back edge between said side edges and thereby pull back portions of said side edges towards each other; and
      wherein said panels are positioned over a vehicle and said front and back edges are cinched to removably secure said panels to said vehicle.

2. The automotive covering device as in claim 1, wherein said bottom panel comprises a cloth material.

3. The automotive covering device as in claim 1, wherein said top panel comprises a generally water resistant material.

4. The automotive covering device as in claim 1, wherein each of said cushioning members comprises a plurality of resilient pellets, wherein an outer surface of a top panel portion of each of said packets generally has a convex shape.

5. The automotive covering device as in claim 1, further including a plurality of strap members, each of said strap members being elongate and having a first portion and a second portion, each of said first portions being securely attached to said top surface of said top panel and extending between a pair of lateral side edges of said top panel, said first portions having an outer surface having a plurality of loop members thereon, each of said second portions of said strap members having and end having a hook portion thereon adapted for releasably engaging one of said loop members.

6. The automotive covering device as in claim 1, wherein said first cinching means includes a first and second flexible elongate member, each of said flexible elongate members having a first end securely attached to one of said lateral side edges of said top panel, each of said flexible elongate members extending between said top and bottom panels toward a middle portion of said front edge, each of said flexible elongate members extending outwardly away from said front edge, said second cinching means including a first and second flexible elongate member, each of said flexible elongate members of said second cinching means having a first end securely attached to one of said lateral side edges of said top panel, each of said flexible elongate members extending between said top and bottom panels toward a middle portion of said back edge, each of said flexible elongate members extending outwardly away from said back edge.

7. The automotive covering device as in claim 6, further including a pair of securing means for selectively coupling a pair of said flexible elongate members together, each respective pair of flexible elongate members extending through one of said securing means.

8. An automotive covering device for protecting a vehicle against hail damage, said device comprising:
   a bottom panel having a top surface, a bottom surface and a peripheral edge, said bottom panel comprising a cloth material;
   a top panel having a top surface, a bottom surface and a peripheral edge, said peripheral edge of said top panel being securely attached to said peripheral edge of said bottom panel, said bottom surface of said top panel being securely attached to said top surface of bottom panel along a plurality of longitudinal lines and latitudinal lines in a grid pattern such that a plurality of discrete packets are defined, said top panel comprising a generally water resistant material, said water resistant material comprising tarpaulin;
      wherein said top and bottom panels collectively have a front edge for positioning adjacent to a front edge of the vehicle, a back edge for positioning adjacent to a back of the vehicle, and side edges for positioning adjacent to sides of the vehicle, said front and back edges each extending between said side edges;
   a plurality of cushioning members, each of said cushioning members being positioned within one of said packets, each of said cushioning members comprising a plurality of resilient pellets, each of said pellets comprising a polystyrene plastic material, wherein an outer surface of a top panel portion of each of said packets generally has a convex shape;
   a plurality of strap members, each of said strap members being elongate and having a first portion and a second portion, each of said first portions being securely attached to said top surface of said top panel and extending between a pair of lateral side edges of said top panel, said first portions having an outer surface having a plurality of loop members thereon, each of said second portions of said strap members having and end having a hook portion thereon adapted for releasably engaging one of said loop members;
   a first cinching means for cinching said front edge of said top and bottom panels to selectively contract an effective length of said front edge between said side edges and thereby pull front portions of said side edges towards each other, said cinching means comprising a first and second flexible elongate member, each of said flexible elongate members having a first end securely attached to one of said lateral side edges of said top panel, each of said flexible elongate members extending between said top and bottom panels toward a middle portion of said front edge, each of said flexible elongate members extending outwardly away from said front edge, each of said flexible elongate members being selectively extendable through a securing means for selectively coupling said flexible elongate members together; and a second cinching means for cinching said back edge of said top and bottom panels to selectively contract an effective length of said back edge between said side edges and thereby pull back portions of said side edges towards each other, said second cinching means comprising a first and second flexible elongate member, each of said flexible elongate members of said second cinching means having a first end securely attached to one of said lateral side edges of said top panel, each of said flexible elongate members extending between said top and bottom panels toward a middle portion of said back edge, each of said flexible elongate members extending outwardly away from said back edge, each of said flexible elongate members being selectively extendable through a securing means for selectively coupling said flexible elongate members together.

* * * * *